(12) United States Patent  (10) Patent No.: US 9,305,589 B2
Kang  (45) Date of Patent: Apr. 5, 2016

(54) METHOD TO DETERMINE PRESENCE OF ROTATOR AND METHOD TO ADJUST OPTIMAL GAIN

(75) Inventor: Kyu Tae Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 898 days.

(21) Appl. No.: 13/184,645

(22) Filed: Jul. 18, 2011

(65) Prior Publication Data

US 2012/0032671 A1  Feb. 9, 2012

(30) Foreign Application Priority Data

Aug. 9, 2010  (KR) .................. 10-2010-0076361

(51) Int. Cl.
*H02K 29/08* (2006.01)
*B60S 13/02* (2006.01)
*G11B 19/28* (2006.01)
*B23Q 16/02* (2006.01)
*G11B 19/20* (2006.01)
*G11B 19/24* (2006.01)

(52) U.S. Cl.
CPC .............. *G11B 19/28* (2013.01); *B23Q 16/025* (2013.01); *G11B 19/2009* (2013.01); *G11B 19/24* (2013.01)

(58) Field of Classification Search
CPC ........ G01B 7/30; G11B 19/2009; G11B 5/09; G11B 19/28; G11B 19/24; G11B 19/2018; G11B 19/2045; G11B 19/2027; G11B 17/022; G01D 5/145; B23Q 16/025; E21B 47/0007

USPC .............. 173/192; 324/207.25; 318/264–266, 318/272, 275, 277, 282, 286, 466–469, 629, 318/400.39, 400.38; 104/35
See application file for complete search history.

(56) References Cited

U.S. PATENT DOCUMENTS

| | | | | |
|---|---|---|---|---|
| 4,127,799 A * | 11/1978 | Nakamura et al. | ............. | 318/373 |
| 4,534,706 A * | 8/1985 | Palm | ................... | E21B 47/0007 318/282 |
| 4,677,510 A * | 6/1987 | Shoji et al. | .................. | 360/99.12 |
| 5,014,748 A * | 5/1991 | Nogami et al. | .......... | 137/625.65 |
| 5,373,495 A * | 12/1994 | Takada | ........................ | 369/189 |
| 6,291,815 B1 * | 9/2001 | Sugiyama et al. | ........ | 250/231.13 |
| 6,545,439 B2 * | 4/2003 | Kaeufl et al. | .................. | 318/280 |
| 7,145,130 B2 * | 12/2006 | Sano | ........................ | 250/231.15 |
| 7,414,378 B2 * | 8/2008 | Dawson | ............... | B23Q 16/025 104/35 |
| 2006/0061314 A1 * | 3/2006 | Shinohara et al. | ............ | 318/466 |

FOREIGN PATENT DOCUMENTS

JP  2003-115159 A  4/2003
JP  2003-249004 A  9/2003

\* cited by examiner

*Primary Examiner* — Bentsu Ro
*Assistant Examiner* — Zemenay Truneh
(74) *Attorney, Agent, or Firm* — Sughrue Mion, PLLC (57) ABSTRACT

A rotation driving system and a method to determine the presence of a rotator on a turntable are provided. The rotation driving system includes an encoder to detect rotation information of a motor, and a controller to determine whether or not a rotator is present on a turntable and also, to adjust a gain of the motor according to moment of inertia of the rotator.

17 Claims, 12 Drawing Sheets

METHOD TO DETERMINE PRESENCE OF ROTATOR AND METHOD TO ADJUST OPTIMAL GAIN

CROSS-REFERENCE TO RELATED APPLICATION

This application claims priority from Korean Patent Application No. 2010-0076361, filed on Aug. 9, 2010 in the Korean Intellectual Property Office, the disclosure of which is incorporated herein by reference.

BACKGROUND

1. Field

Methods and apparatuses consistent with the exemplary embodiments relate to a rotation driving system and a method to determine whether or not a rotator is present on a turntable.

2. Description of the Related Art

Disc-type information-recording media, such as a Compact Disc (CD) and a Digital Video Disc (DVD), or disc-type testing apparatuses, such as bio-discs, may be rotated to enable reading of recorded information or testing of bio materials. In preference to rotation, also, it may be necessary to determine whether or not a rotator is present on a turntable. In a related art method of determining whether or not a rotator is loaded on a turntable, a laser beam is irradiated to the rotator such that the presence of the rotator is determined by sensing the beam reflected by the rotator. Determining the presence of the rotator using the related art method, however, may require additional structures, such as a laser source and a circuital organization to sense a laser beam. Also, an additional rotator processing operation to provide the rotator with a specific shape to reflect a laser beam, such as a recess, may be necessary.

SUMMARY

Therefore, it is an aspect of the exemplary embodiments to provide a rotation driving system to determine the presence of a rotator without any additional device and a determination method thereof.

Additional aspects of the exemplary embodiments will be set forth in part in the description which follows and, in part, will be obvious from the description, or may be learned by practice of the exemplary embodiments.

In accordance with one aspect of the exemplary embodiments, a rotation driving system includes a turntable, a motor to rotate the turntable, an encoder to detect rotation information of the motor, and a controller to determine whether or not a rotator is present on the turntable based on the rotation information and also, to adjust a gain of the motor according to moment of inertia of the rotator if the rotator is present.

The encoder may detect the rotation information including a rotation direction and rotation position of the motor.

The controller may measure the maximum displacement of the motor based on the rotation information, and may determine whether or not the rotator is present on the turntable by comparing the maximum displacement with a previously input reference displacement of the motor.

The controller may measure the maximum displacement of the motor plural times if the rotator is present, may calculate the average of a plurality of measured maximum displacement values, and may adjust the gain of the motor to correspond to the average maximum displacement value via a previously input reference relation.

The reference relation may be a relation between the maximum displacement of each of a plurality of reference rotators having different moments of inertia and each gain adjustment coefficient corresponding to the maximum displacement.

In accordance with another aspect of the exemplary embodiments, a method to determine the presence of a rotator includes determining whether or not the rotator is present on a turntable, and adjusting a gain of a motor according to moment of inertia of the rotator if it is determined that the rotator is present.

The determination of the presence of the rotator may include rotating the turntable by driving the motor, detecting rotation information of the motor during driving of the motor by an encoder, measuring the maximum displacement of the motor based on the rotation information, and comparing the maximum displacement with a previously input reference displacement and determining that the rotator is present on the turntable if the maximum displacement is less than the reference displacement.

The rotation of the turntable may include supplying driving current to drive the motor, and stopping the supply of driving current if a supply time of the driving current exceeds a preset reference time.

The detection of the rotation information may include detecting, by the encoder, the rotation information of the motor for a preset detection time.

The rotation information may include a rotation direction and rotation position of the motor.

The maximum displacement may be the maximum rotation angle of the motor.

The reference displacement may be the average of the maximum displacement of the motor when no rotator is present on the turntable and the maximum displacement of the motor when the rotator is present on the turntable.

The adjustment of the gain of the motor may include measuring the maximum displacement of the motor plural times by driving the motor, calculating the average of a plurality of measured maximum displacement values of the motor, and adjusting the gain of the motor to correspond to the average maximum displacement value via a previously input reference relation.

The measurement of the maximum distance of the motor may include supplying driving current to drive the motor, stopping the supply of the driving current if a supply time of the driving current exceeds a previously input reference time, detecting, by the encoder, rotation information of the motor during driving of the motor for a previously input detection time, and measuring the maximum displacement of the motor based on the rotation information.

The reference relation may be a relation between the maximum displacement of each of a plurality of reference rotators having different moments of inertia and each gain adjustment coefficient corresponding to the maximum displacement.

BRIEF DESCRIPTION OF THE DRAWINGS

These and/or other aspects of the inventive concept will become apparent and more readily appreciated from the following description of the exemplary embodiments, taken in conjunction with the accompanying drawings of which.

DETAILED DESCRIPTION OF THE EXEMPLARY EMBODIMENTS

Reference will now be made in detail to the exemplary embodiments, examples of which are illustrated in the accompanying drawings, wherein like reference numerals refer to like elements throughout.

Hereinafter, a rotation driving system and a method to determine the presence of a rotator according to an exemplary embodiment will be described in detail with reference to the accompanying drawings.

In the drawings, the same reference numerals represent the same constituent elements.

Figure 1:
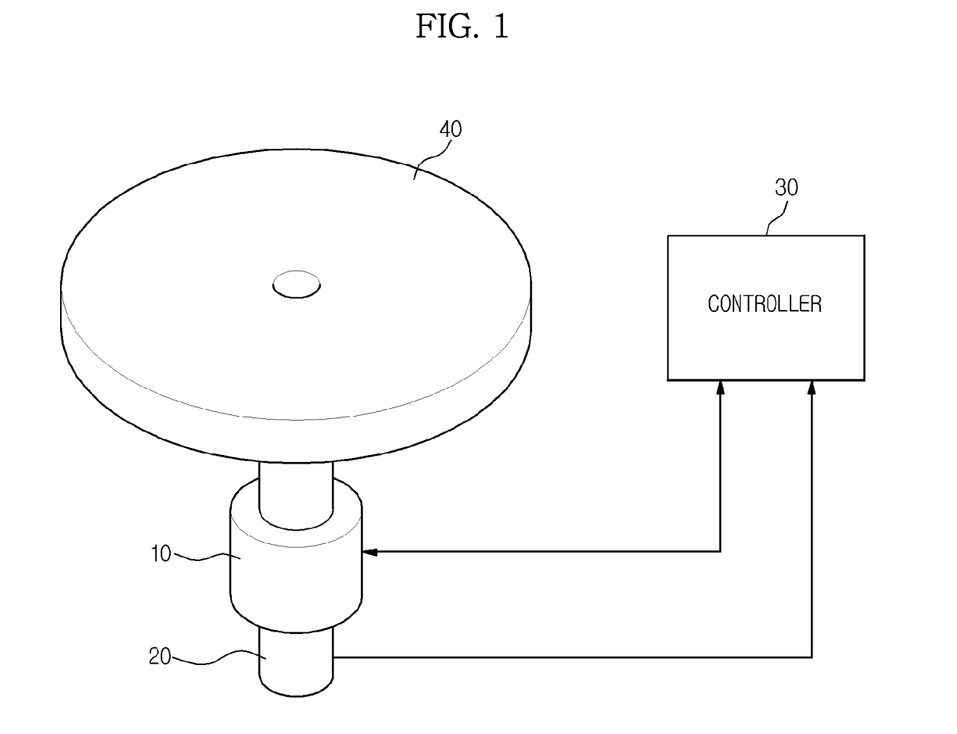
FIG. 1 illustrates a rotation driving system according to an exemplary embodiment.

FIG. 1 illustrates a rotation driving system according to an exemplary embodiment.

The rotation driving system may include a turntable 40 on which a disc-shaped rotator is loaded, a motor 10 to rotate the turntable 40, an encoder 20 to sense rotation information including the rotation direction and rotation position of the motor 10, and a controller 30 to control operation of the motor 10 and measure a displacement of the motor 10 based on the rotation position of the motor 10 sensed by the encoder 20.

The encoder 20 serves to detect the rotation direction and rotation position of an object that is being rotated, such as the motor 10. During driving of the motor 10, two pulse signals to enable discrimination of the rotation direction of the motor 10 are generated in proportion to the rotation position. Pulses generated from two terminals have a phase difference upon clockwise rotation and counterclockwise rotation. The rotation direction of the rotating object may be discriminated using the phase difference. Also, revolutions per minute of the rotating object may be determined based on the number of pulses generated on a per second basis because the number of pulses is variable according to the rotation position.

The controller 30 measures the maximum displacement of the motor 10, i.e. the maximum rotation angle using the rotation information including the rotation direction and rotation position of the motor 10 detected by the encoder 20. Then, the controller 30 determines whether or not a rotator is present on the turntable 40 by comparing the measured maximum displacement of the motor 10 with a reference displacement that has been previously input to the controller 30 and serves as a criterion to determine the presence of the rotator.

If it is determined that a rotator is present on the turntable 40, the controller 30 adjusts a gain of the motor 10 according to a specific moment of inertia of the rotator. To this end, the controller 30 measures the maximum displacement of the motor 10 plural times in a state in which the rotator is present, and calculates the average of the plural maximum displacement values. Subsequently, the controller 30 calculates a gain adjustment coefficient, required to adjust the gain of the motor 10, using the calculated average of the plural maximum displacement values and a reference relation that has been previously input to the controller 30. The reference relation means a relation between the maximum displacement value of the motor 10 corresponding to each rotator, which is obtained by rotating a plurality of reference rotators having different moments of inertia, and a gain adjustment coefficient depending on the maximum displacement value of the motor 10.

Figure 2:
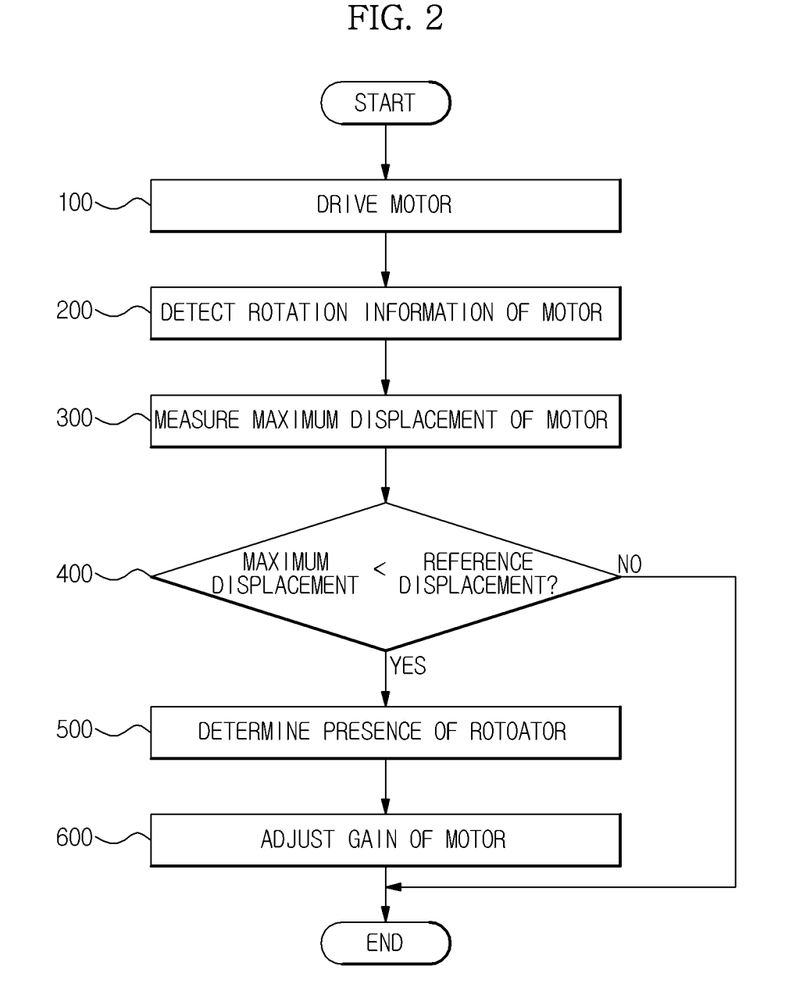
FIG. 2 is a flow chart of a method to determine the presence of a rotator according to an exemplary embodiment.

FIG. 2 is a flow chart of a method of determining the presence of a rotator according to an exemplary embodiment.

The controller 30 drives the motor 10 to rotate the turntable 40 when attempting to determine whether or not a rotator is present on the turntable 40 (operation 100). Specifically, the controller 30 supplies driving current to the motor 10 to drive the motor 10. Here, the driving current means current to rotate the stationary motor 10 by a predetermined angle or more. Then, the controller 30 determines whether or not a driving current supply time exceeds a previously input reference supply time. If the driving current supply time exceeds the reference supply time, the controller 30 stops the supply of driving current. In the exemplary embodiment, the controller 30 adopts the driving current of 0.25 A and the reference supply time of 50 msec. Of course, the driving current and the reference supply time may be set differently.

Next, the encoder 20 detects the rotation information of the motor 10 during rotation of the motor 10 (operation 200). The encoder 20 detects the rotation information of the motor 10 for a previously input detection time. The rotation information may include the rotation direction and rotation position of the motor 10, but is not limited thereto. The motor 10 continues driving for a predetermined time after the supply of driving current stops. Since the encoder 20 detects the rotation information of the motor 10 during driving of the motor 10, the detection time of the encoder 20 may be set to be greater than the reference supply time of driving current. In the exemplary embodiment, the detection time of the encoder 20 is set to 100 msec. Of course, the detection time may be set differently.

Next, the controller 30 measures the maximum displacement of the motor 10 using the rotation information of the motor 10 detected by the encoder 20 (operation 300). The maximum displacement is represented by the maximum rotation angle of the motor 10 for the detection time of the encoder 20.

Next, the controller 30 compares the measured maximum displacement of the motor 10 with a previously input reference displacement. The reference displacement means an average value of the maximum displacement of the motor 10 when a rotator is present on the turntable 40 and the maximum displacement of the motor 10 when no rotator is present on the turntable 40. To more accurately set the reference displacement, the maximum displacement of the motor 10 when a rotator is present and the maximum displacement of the motor 10 when no rotator is present may be measured plural times. In the exemplary embodiment, the maximum displacement of the motor 10 required to set the reference displacement is repeatedly measured 20 times. Of course, measurement of the maximum displacement may be repeated a different number of times.

Figure 3A:
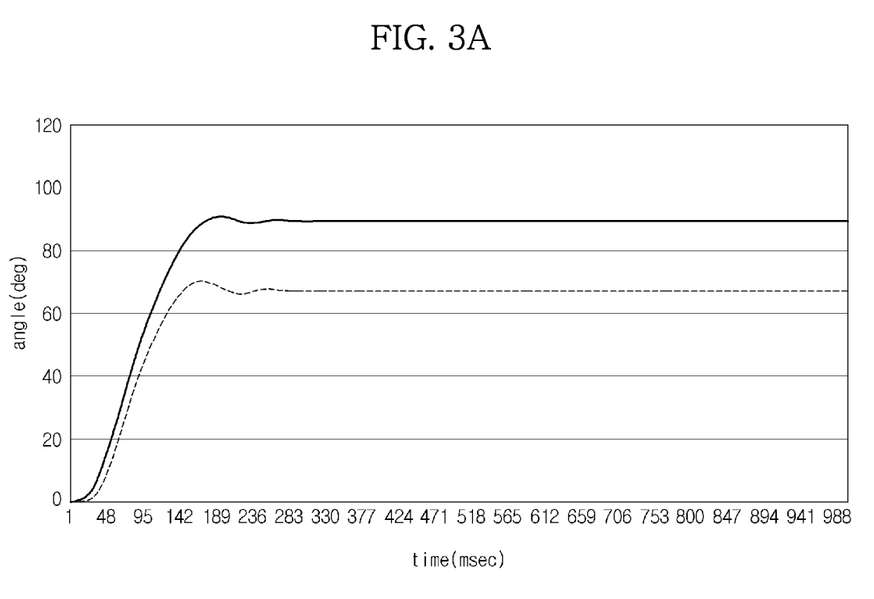
FIGS. 3A and 3B are graphs recording a displacement of a motor when no rotator is present according to an exemplary embodiment.
Figure 3B:
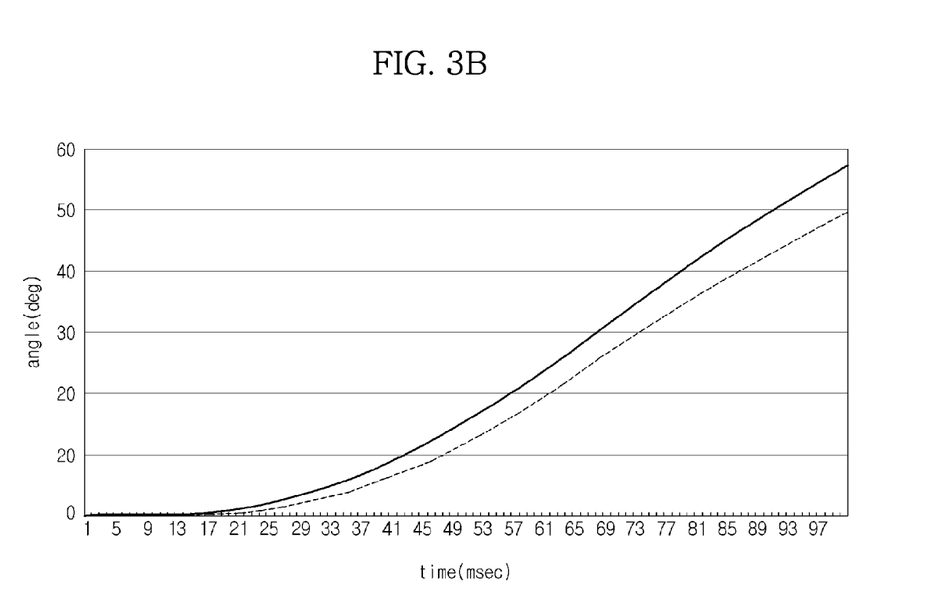
Figure 4:
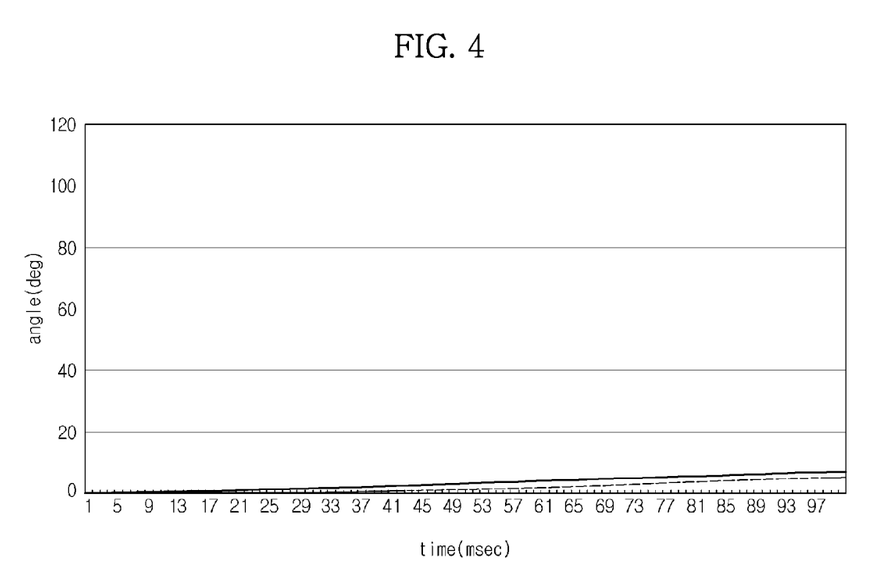
FIG. 4 is a graph recording a displacement of a motor when a rotator is present according to an exemplary embodiment.

FIGS. 3A and 3B are graphs recording a displacement of the motor 10 based on a time when no rotator is present on the turntable 40 according to an exemplary embodiment, and FIG. 4 is a graph recording a displacement of the motor 10 based on time when a rotator is present on the turntable 40 according to an exemplary embodiment. The graphs of FIGS. 3A, 3B and 4 record a displacement of the motor 10 when the driving current of 0.25 A is supplied for the reference supply time of 50 msec. FIG. 3A illustrates a displacement of the motor 10 until the motor 10 reaches a normal state having no further displacement variation, and FIGS. 3B and 4 illustrates a displacement of the motor 10 when the detection time of the encoder 20 is set to 100 msec. In the graphs of FIGS. 3A, 3B and 4, the solid line and the dotted line respectively represent the maximum measured value of the motor's displacement and the minimum measured value of the motor's displacement obtained after repeating the displacement measurement 20 times, and illustration of displacement values therebetween is omitted. FIG. 3B shows that the maximum displacement of the motor 10 exceeds 40 degrees when no rotator is present on the turntable 40, and FIG. 4 shows that the maximum displacement of the motor 10 does not exceed 10 degrees when a rotator is present on the turntable 40. As the mass or radius of a rotator, i.e. the moment of inertia of the rotator increases, the maximum displacement of the motor 10 may be smaller than 10 degrees. On the other hand, if no rotator is present on the turntable 40, the maximum displacement of the motor 10 may increase to 60 degrees. Accordingly, to derive a reference displacement having greater reliability, the maximum displacement of the motor 10 when a rotator is present may be set to 40 degrees which is less than the actual maximum displacement value (about 50~60 degrees) illustrated in FIG. 3B, and the maximum displacement of the motor 10 when no rotator is present may be set to 10 degrees, which is greater than the actual maximum displacement value (about 5~6 degrees) illustrated in FIG. 4.

Accordingly, the reference displacement may be preset to 25 degrees, which is the average of 40 degrees and 10 degrees and has been input to the controller 30. Of course, the reference displacement may be differently set according to the kind or performance of the rotation driving system.

Next, if it is determined from the comparative result that the maximum displacement of the motor 10 is less than the reference displacement, the controller 30 determines that a rotator is present on the turntable 40 (operation 500). That is, if the maximum displacement of the motor 10 is less than the reference displacement of 25 degrees, the controller 30 determines that a rotator is present on the turntable 40.

Next, the controller 30 adjusts a gain of the motor 10 to provide the motor 10 with a gain corresponding to a rotator present on the turntable 40 (operation 600). Specifically, the controller 30 adjusts a basic gain of the motor 10, which is set for a general disc-type rotator, for example, a CD or DVD, to a value corresponding to any rotator loaded on the turntable 40. That is, the controller 30 adjusts the gain of the motor 10 according to moments of inertia of different rotators. Of course, the basic gain of the motor 10 may vary according to the kind of the rotation driving system. In the case where the motor 10 is operated based on a predetermined fixed gain without adjusting the gain of the motor 10 according to a rotator, the motor 10 may fail to exhibit optimal performance suitable for the rotator if a factor having an effect on the moment of inertia of the rotator (for example, the mass or radius of the rotator) is changed.

Figure 5:
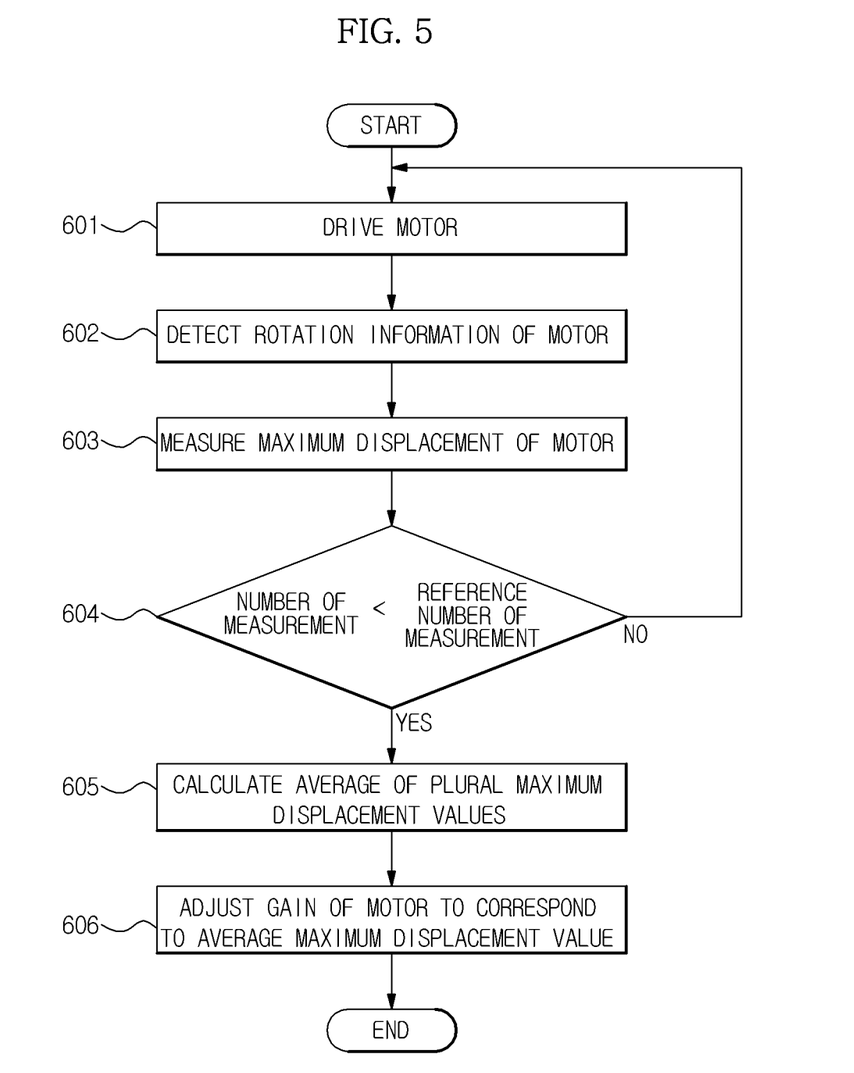
FIG. 5 is a flow chart of a method to adjust a gain of a motor according to an exemplary embodiment.

Hereinafter, sequential operations to adjust the gain of the motor 10 (operation 600) will be described with reference to FIG. 5.

The controller 30 drives the motor 10 to rotate the turntable 40 so as to adjust the gain of the motor 10 (operation 601).

Next, the encoder 20 detects the rotation information of the motor 10 during rotation of the motor 10 (operation 602).

Next, the controller 30 measures the maximum displacement of the motor 10 using the rotation information of the motor 10 detected by the encoder 20 (operation 603). The above described operations are identical to operations 100 to 300 included in the above described method to determine the presence of the rotator and thus, a repeated description thereof will be omitted.

Next, the controller 30 repeats the above described operations plural times to more accurately measure the maximum displacement of the motor 10. If the number of repeated measurements exceeds a predetermined reference measurement number, the controller 30 stops measurement of the maximum displacement of the motor 10 and calculates the average of a plurality of maximum displacement values obtained via the repeated measurements (operations 604 and 605). Although the reference measurement number according to the exemplary embodiment is set to 3 times, of course, the maximum displacement may be measured by changing the reference measurement number.

Next, the controller 30 adjusts the gain of the motor 10 to correspond to the average maximum displacement value of the motor 10 (operation 606). To this end, the controller 30 utilizes a reference relation between a previously input maximum displacement value of a reference rotator and a corresponding gain adjustment coefficient. The gain adjustment coefficient is a proportional coefficient that increases as the maximum displacement of the motor 10 decreases, and may be used to adjust the gain of the motor 10. The reference relation used to adjust the gain of the motor 10 means a relation between the maximum displacement value of the motor 10 corresponding to each reference rotator, which is obtained by rotating a plurality of reference rotators having different moments of inertia, and a gain adjustment coefficient depending on the maximum displacement value of the motor 10.

Hereinafter, sequential operations to adjust the gain adjustment coefficient of the motor 10 using the reference relation will be described with reference to FIGS. 6A and 6B.

Figure 6A:
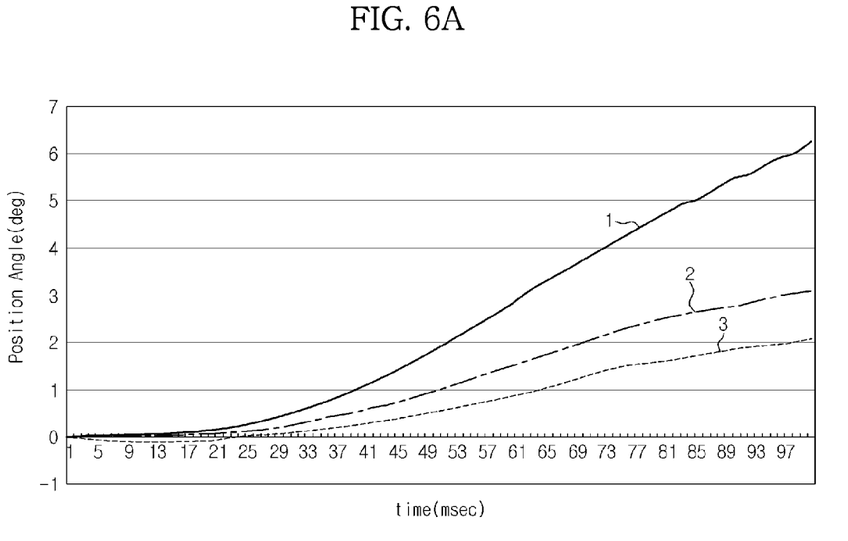
FIG. 6A is a graph recording a displacement of a motor with respect to rotators having different moments of inertia according to an exemplary embodiment.

FIG. 6A is a graph recording a displacement of the motor 10 based on a variation in the moment of inertia of a rotator according to an exemplary embodiment. In the graph, the solid line of No. 1 and the dash-dotted line of No. 2 represent displacements of the motor 10 with respect to two reference rotators having different moments of inertia. Specifically, the solid line of No. 1 represents that the maximum displacement value of the reference rotator having the gain adjustment coefficient of 0.00009 is 6, and the dash-dotted line of No. 2 represents that the maximum displacement value of the reference rotator having the gain adjustment coefficient of 0.00015 is 3. These data have been previously obtained via experimentation and have been input to the controller 30. If it is determined that an objective rotator is present on the turntable 40, the controller 30 may adjust the gain of the motor 10 to correspond to the maximum displacement value of the motor 10 with respect to the objective rotator by use of the data.

The dotted line of No. 3 represents a displacement of the motor 10 with respect to the objective rotator present on the turntable 40. The gain of the motor 10 is adjusted based on the objective rotator, and the maximum displacement value of the motor 10 with respect to the objective rotator is 2. The controller 30 calculates a gain adjustment coefficient, required to adjust the gain of the motor 10, based on the previously input data of the reference rotators represented by the lines of Nos. 1 and 2 and the maximum displacement value of the motor 10 with respect to the objective rotator currently present on the turntable 40.

Figure 6B:
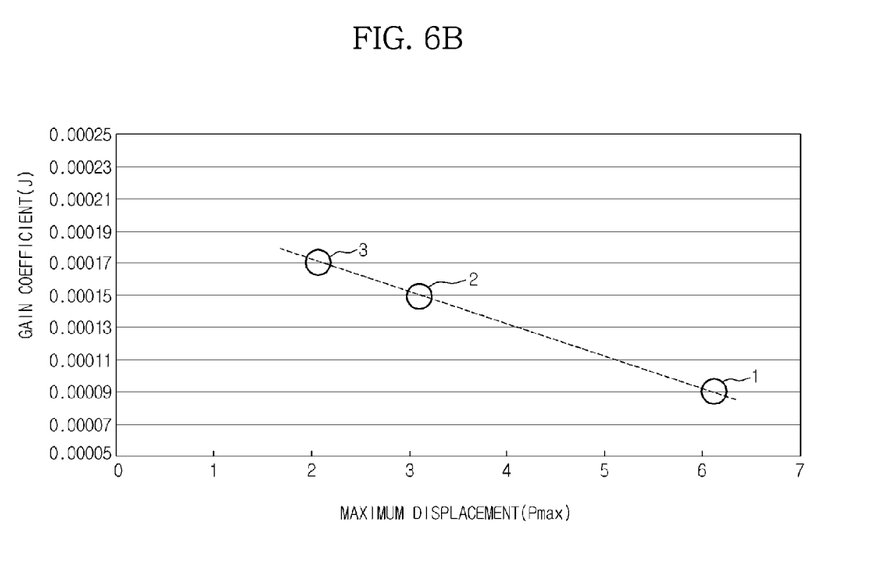
FIG. 6B is a graph recording the again adjustment coefficient of a motor with respect to the maximum displacement of the motor according to an exemplary embodiment.

FIG. 6B is a graph illustrating a linear relationship between the maximum displacement value and the gain adjustment coefficient of the lines of Nos. 1 and 2 of FIG. 6A. In FIG. 6B, the circle of No. 1 corresponds to the line of No. 1 of FIG. 6A, and the circle of No. 2 corresponds to the line of No. 2 of FIG. 6A. Considering the circle of No. 3 in FIG. 6B, it will be appreciated that the maximum displacement value of the motor 10 with respect to the objective rotator currently present on the turntable 40 is 2 and the gain adjustment coefficient of the motor 10 corresponding to the maximum displacement value of 2 is 0.00017. In this way, the controller 30 may adjust the gain of the motor 10 to correspond to the objective rotator using a relationship between the previously input maximum displacement of the motor 10 and the gain adjustment coefficient, i.e. the reference relation if it is determined that the objective rotator is currently present on the turntable 40.

Figure 7A:
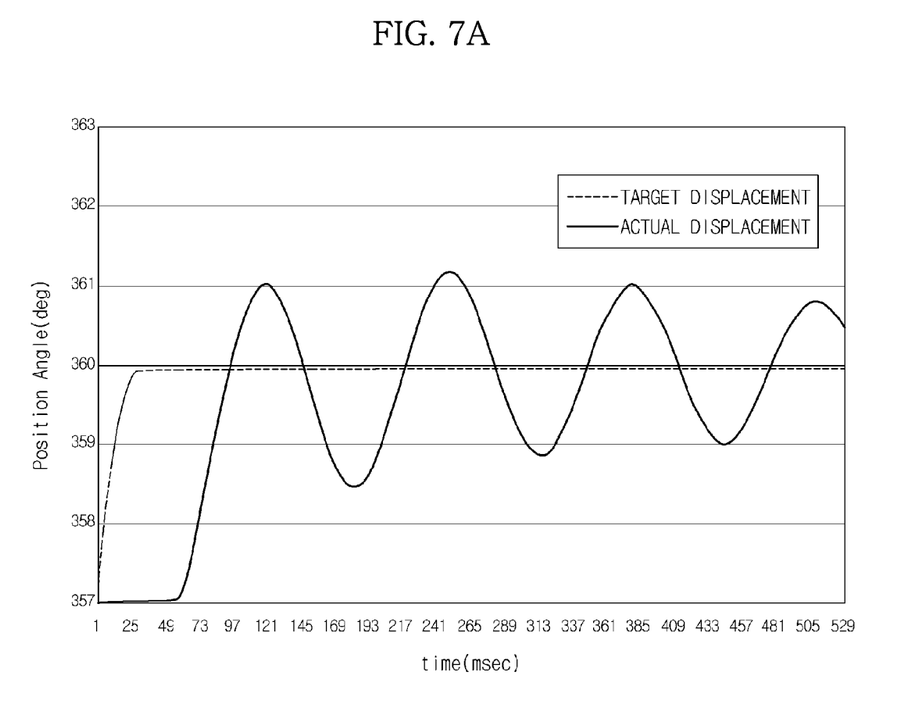
FIGS. 7A to 7D are graphs recording a target displacement and an actual displacement before and after adjustment of a gain of a motor according to an exemplary embodiment.
Figure 7B:
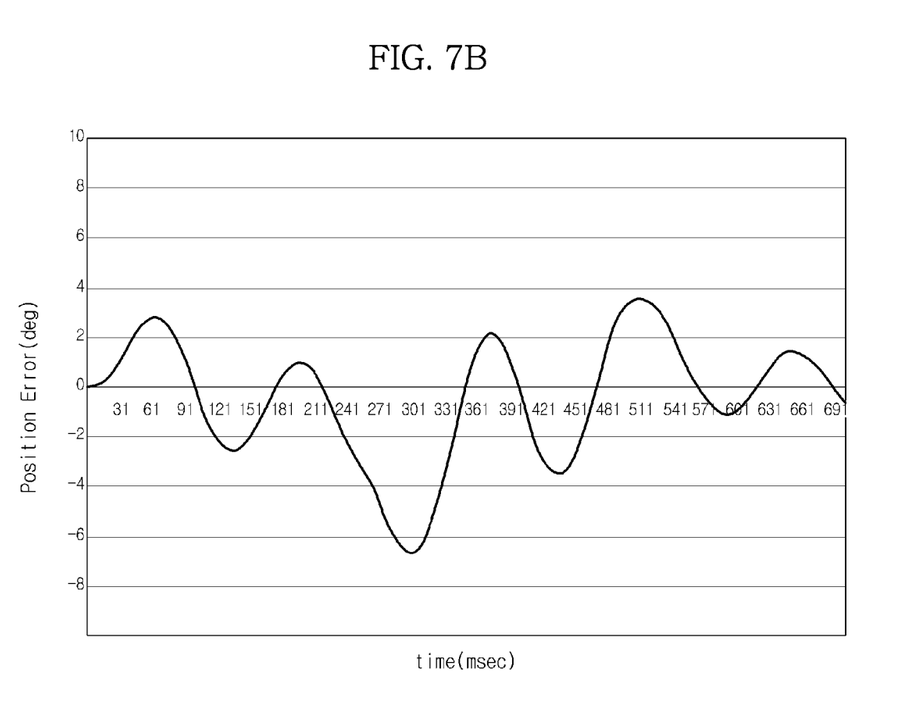

In a state in which the objective rotator is present on the turntable 40 before the gain adjustment coefficient of the motor 10 is adjusted from 0.00009 to 0.00017, FIG. 7A shows the rate at which the actual displacement of the motor 10 converges upon a target displacement, and FIG. 7B shows the magnitude of a difference between the actual displacement and the target displacement. It will be appreciated that the actual displacement of the motor 10 converges upon the target displacement for 529 msec or more if the gain adjustment coefficient of the motor 10 is 0.00009, and that the difference between the actual displacement and the target displacement is in a range of about −6 degrees to +3 degrees.

Figure 7C:
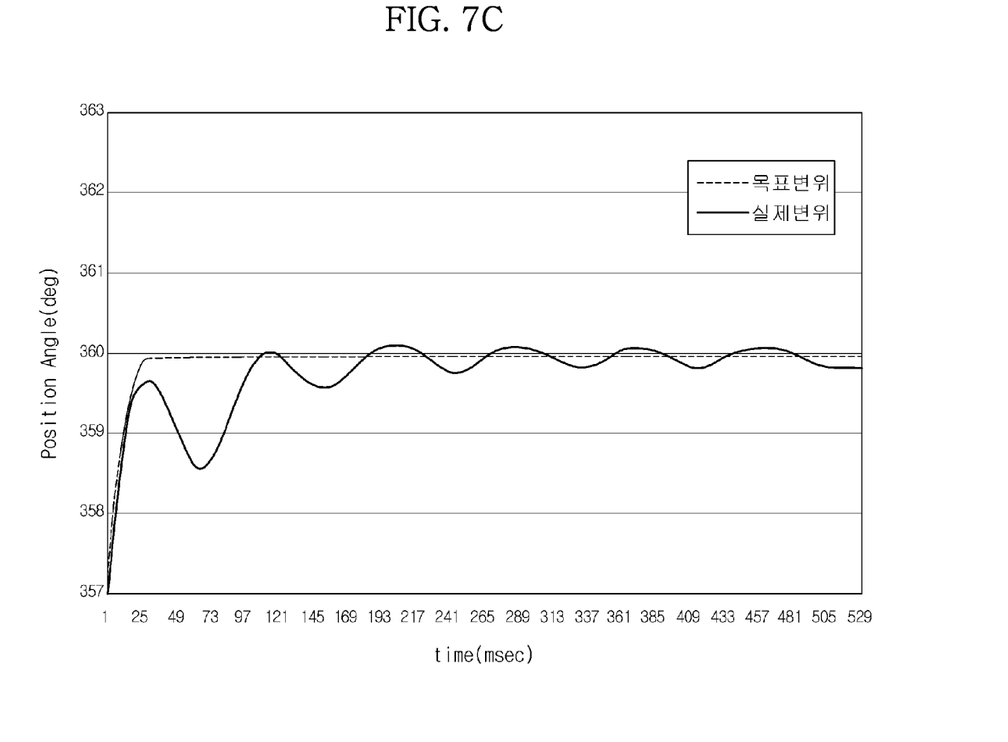
Figure 7D:
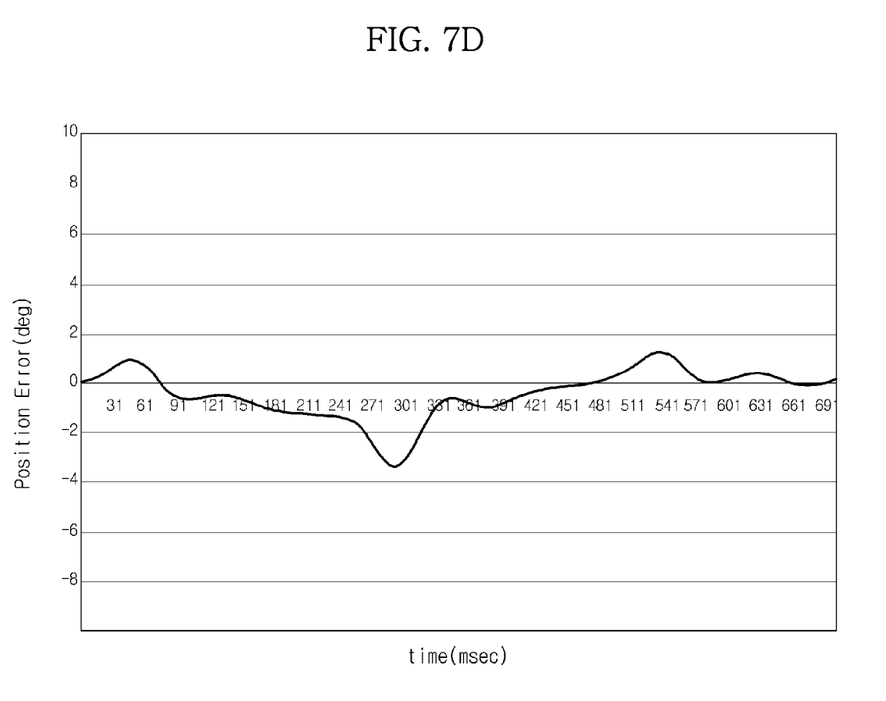

Also, in a state in which the objective rotator is present on the turntable 40 after the gain adjustment coefficient of the motor 10 is adjusted from 0.00009 to 0.00017, FIG. 7C shows the rate at which the actual displacement of the motor 10 converges upon a target displacement, and FIG. 7D shows the magnitude of a difference between the actual displacement and the target displacement. It will be appreciated that the actual displacement of the motor 10 converges upon the target displacement for about 230 msec if the gain adjustment coefficient of the motor 10 is adjusted to 0.00017, and that the difference between the actual displacement and the target displacement is in a range of about −3 degrees to +1.5 degrees. This shows that the actual displacement converges upon the target displacement more than twice as rapidly as when the gain adjustment coefficient is 0.00009, and that the difference between the actual displacement and the target displacement is reduced by 50%. That is, adjusting the gain of the motor 10 to correspond to the objective rotator may improve the performance of the rotation driving system.

As is apparent from the above description, according to the exemplary embodiment, it may be possible to determine the presence of a rotator by simply using a motor and an encoder without any subordinate device. This may simplify the configuration of a rotation driving system, resulting in cost reduction. Further, according to the exemplary embodiment, the gain of the motor may be adjusted according to the moment of inertia of the rotator, enabling an improvement in the performance of the rotation driving system.

Although a few exemplary embodiments have been shown and described, it would be appreciated by those skilled in the art that changes may be made in these exemplary embodiments without departing from the principles and spirit of the exemplary embodiments, the scope of which is defined in the claims and their equivalents.

What is claimed is:

1. A rotation driving system comprising:
   a turntable configured to allow a rotator to be loaded thereon, the rotator having a shape of a disc and comprising at least one of an information-recording medium and a testing apparatus;
   a motor configured to rotate the turntable;
   an encoder configured to generate pulse signals according to rotation of the motor, and detect rotation displacement of the motor based on the pulse signals; and
   a controller configured to determine whether or not the rotator is present on the turntable based on the rotation displacement, and adjust a gain of the motor according to a moment of inertia of the rotator in response to determining that the rotator is present.

2. The system according to claim 1, wherein the encoder detects at least one of a rotation direction and rotation position of the motor based on the rotation displacement.

3. The system according to claim 1, wherein the controller measures a maximum displacement of the motor based on the pulse signals, and determines whether or not the rotator is present on the turntable by comparing the maximum displacement of the motor with a previously input reference displacement of the motor.

4. The system according to claim 1, wherein the controller measures a maximum displacement of the motor plural times if the rotator is present, calculates an average of a plurality of measured maximum displacement values, and adjusts the gain of the motor to correspond to the average maximum displacement value based on a previously input reference relation.

5. The system according to claim 4, wherein the reference relation is a relation between a maximum displacement of each of a plurality of reference rotators having different moments of inertia and gain adjustment coefficients corresponding to the maximum displacement.

6. The rotation driving system of claim 1, wherein the controller is configured to determine whether or not a rotator is present on the turntable based on the encoder and the motor, without the use of any other additional device.

7. The rotation driving system of claim 1, wherein the controller is configured to adjust the gain of the motor according to a moment of inertia corresponding to a type of rotator on the turntable, from among a plurality of different types of rotators.

8. A method to determine a presence of a rotator, the method comprising:
   determining whether or not the rotator is present on a turntable using an encoder configured to generate pulse signals according to rotation of a motor, and detect rotation displacement of the motor based on the pulse signals, the rotator having a shape of a disc and comprising at least one of an information-recording medium and a testing apparatus; and
   adjusting a gain of the motor according to a moment of inertia of the rotator in response to determining that the rotator is present.

9. The method according to claim 8, wherein the determination of the presence of the rotator includes:
   rotating the turntable by driving the motor;
   generating, by the encoder, the pulse signals according to rotation of the motor;
   detecting, by the encoder, a maximum displacement of the motor based on the pulse signals during the driving of the motor; and
   comparing the maximum displacement of the motor with a previously input reference displacement and determining that the rotator is present on the turntable if the maximum displacement of the motor is less than the reference displacement.

10. The method according to claim 9, wherein the rotation of the turntable includes:
    supplying driving current to drive the motor; and stopping the supply of driving current if a supply time of the driving current exceeds a preset reference time.

11. The method according to claim 9, wherein the detecting of the maximum displacement includes detecting the rotation displacement of the motor for a preset detection time by the encoder.

12. The method according to claim 9, wherein the detecting of the maximum displacement includes detecting at least one of a rotation direction and a rotation position of the motor based on the rotation displacement.

13. The method according to claim 9, wherein the maximum displacement is the maximum rotation angle of the motor.

14. The method according to claim 9, wherein the reference displacement is an average of the maximum displacement of the motor when no rotator is present on the turntable and the maximum displacement of the motor when the rotator is present on the turntable.

15. The method according to claim 9, wherein the reference relation is a relation between the maximum displacement of each of a plurality of reference rotators having different moments of inertia and each gain adjustment coefficient corresponding to the maximum displacement.

16. The method according to claim 8, wherein the adjustment of the gain of the motor includes:
measuring the maximum displacement of the motor plural times by driving the motor;
calculating the average of a plurality of measured maximum displacement values of the motor; and
adjusting the gain of the motor to correspond to the average maximum displacement value via a previously input reference relation.

17. The method according to claim 16, wherein the measurement of the maximum distance of the motor includes:
supplying a driving current to drive the motor;
stopping the supply of the driving current if a supply time of the driving current exceeds a previously input reference time;
generating, by the encoder, the pulse signals according to the rotation of the motor during the driving of the motor for a previously input detection time; and
measuring the maximum displacement of the motor based on the pulse signals.

* * * * *